Sept. 17, 1929.   E. W. VANDERHOFF   1,728,457
SHADE ROLLER
Filed March 14, 1928
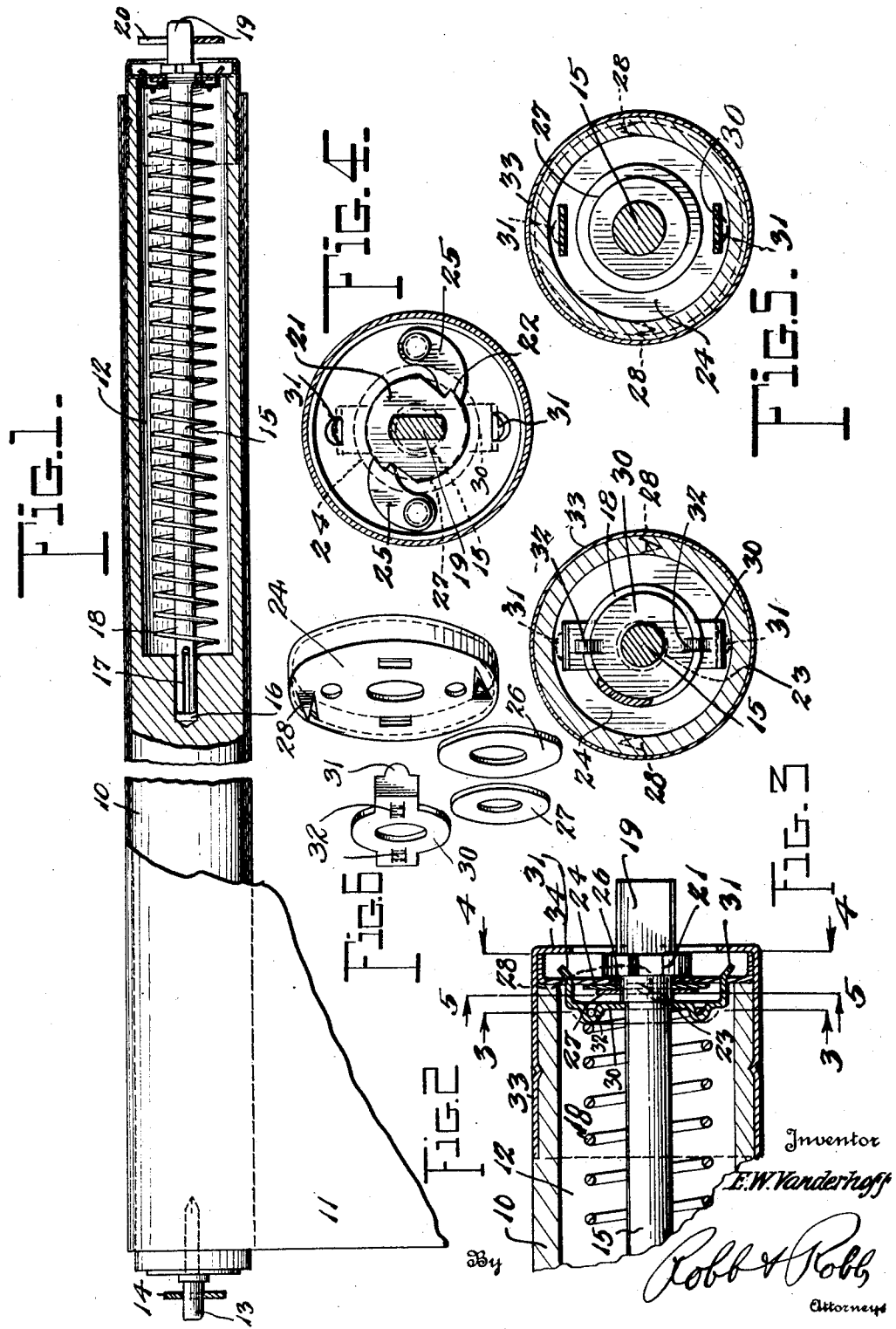

Patented Sept. 17, 1929.

1,728,457

UNITED STATES PATENT OFFICE

ERNEST W. VANDERHOFF, OF SAGINAW, MICHIGAN

SHADE ROLLER

Application filed March 14, 1928. Serial No. 261,660.

This invention relates to a shade roller and particularly to the construction of the spring controlled spindle thereof which cooperates with a pawl and ratchet retaining means.

In the previous formation of spindles for shade rollers a number of separate operations are necessary to form and assemble the parts thereof which involve considerable time and expense in the production of the spindles, and this invention provides means to economize such production by the formation of the spindle from a single rod or wire by a stamping or die pressing operation.

In the prior art the means used to secure the tension spring and provide a bearing for the spindle have not proven effective nor efficient and this invention presents a structure wherein the spring holder is supported from the casing or flanged plate carrying the pawls and is formed with a bearing for the spindle.

The invention has for an object to provide a novel structure of spindle formed from a rod or wire by a single pressure operation to upset the ratchet collar and bearing adjacent thereto, form the pawl seats upon the collar, and flatten the retained end of the spindle.

A further object of the invention is to provide an improved construction of shade roller including a spindle mounted for movement relative thereto and an open casing or flanged plate provided with holding pawls and supporting at its inner face a plate for retaining the outer end of the spring which is connected to the spindle at its opposite end.

A further object of the invention is to provide a new structure of shade roller wherein the spindle is formed with a ratchet collar and bearing surface adjacent thereto which cooperate with the plate carrying pawls riding upon the collar and also supporting at its rear a holding yoke having eyes to receive the outer end of the tensioning spring which is connected at its opposite end to the spindle.

Other and further objects and advantages of the invention will be hereinafter set forth and the novel features thereof defined by the appended claims.

In the drawing:

Fig. 1 is a longitudinal section of a shade roller with parts in elevation;

Fig. 2 is an enlarged detail at the spindle end;

Fig. 3 is a section on line 3—3 of Fig. 2;

Fig. 4 is a similar view on line 4—4; and

Fig. 5 is a like section on line 5—5.

Fig. 6 is a perspective view of the casing or flanged, pawl-carrying plate, the supplemental spring carrying yoke bearing member, the wear insert and the retaining washer 27.

Like numerals refer to like parts in the several figures of the drawings.

The numeral 10 designates a shade roller which may be of any desired construction or size. The roller is adapted to have the usual curtain or shade 11 attached thereto, the movement of which imparts rotation to the roller, and one end of said roller is formed with a recess 12 while the opposite end is provided with a bearing 13 adapted to seat in a bracket 14 in the usual manner. This bearing is driven into the body of the roller or otherwise secured to rotate with the roller.

Within the chamber or recess 12 an elongated spindle 15 is disposed and is rotatably seated at its inner end in a bearing 16 formed in the body of the roller. This inner end of the spindle is preferably slotted as at 17 to receive the end of the tensioning spring 18 applied thereto in the ordinary manner. The opposite end of the spindle is flattened at 19 and seats in a bracket 20 to prevent rotation of the spindle. At the inner portion of the flattened end 19 a ratchet collar 21 is formed and provided with seats 22 while at the inner face of this collar a bearing surface 23 is formed upon the spindle.

The present invention contemplates the formation of this spindle from a rod or wire by a simple stamping or die pressing operation which upsets the ratchet collar and bearing and also produces the flattened end thus securing an integral metallic structure which avoids the necessity of a number of operations in forming and assembling the parts.

The bearing surface 23 cooperates with a central aperture formed in the open casing or flanged plate 24 and this casing has pivotally mounted thereon the pawls 25 which cooperate with the seats 22 of the collar. The bearing formed at the central portion of the casing or flanged plate may be provided with a wear insert 26, which comprises a brass bushing and the parts are held in proper position with the collar abutting the casing by means of a washer 27 which may be forced or swaged upon the bearing surface 23 and into contact with the casing. The outer periphery is disposed at an angle to the pawl carrying casing or flanged plate, and this plate is formed with prongs 28 adapted to be inserted on the end of the wooden roller to prevent any rotative movement of the casing thereon.

For the purpose of retaining the outer end of the spring 18 and also provide a supplemental bearing for the spindle, a yoke member 30 is mounted upon the casing at the inner face of the bearing 23 and is secured in position by laterally extending lugs 31 which may be of any desired length to space the yoke from the pawl casing. This yoke 30 is formed with loops or eyes 32 through which the outer end of the spring 18 is passed to connect the same to the pawl casing.

If desired a retaining ferrule 33 may be clamped upon the outer face of the roller and formed with an angular flange 34 at the end thereof which overhangs the flange of the pawl casing.

While these specific details of construction have been shown and described, the invention is not confined thereto as changes and alterations may be made therein without departing from the spirit of the invention as recited in the following claims.

What I claim is:

1. A spindle unit for shade rollers comprising a spindle rod formed with a spring securing bearing member at one end, a flattened bracket engaging portion at the other end, an enlarged ratchet collar adjacent the flattened portion, an intermediate enlarged bearing portion adjacent the ratchet collar, a flanged supporting bearing casing on the bearing surface provided with roller engaging prong members and ratchet pawls, a supplemental retaining yoke bearing member on the spindle adjacent said bearing surface and secured to the supporting casing in spaced relation, said yoke member having spring engaging portions, a retaining washer secured on the bearing portion intermediate the yoke member and supporting casing to retain said casing and member on the spindle, and a coil spring engaging the spring securing bearing member of the spindle at one end and the spring engaging portion of the yoke member at the other end.

2. In a shade roller construction, a roller provided with a bracket engaging pintle at one end and being recessed at the other end to receive a spindle unit and form a bearing therefor, a spindle unit within the recess comprising a spindle rod formed with a spring securing bearing member at one end, a flattened bracket engaging portion at the other end, an enlarged ratchet collar adjacent the flattened portion, an intermediate bearing portion adjacent the ratchet collar, a flanged supporting bearing casing on the bearing surface provided with roller engaging prong members and ratchet pawls, a supplemental retaining yoke bearing member on the spindle adjacent said bearing surface and secured to the supporting casing in spaced relation, said yoke member having spring engaging portions, a retaining washer secured on the bearing portion intermediate the yoke member and supporting casing to retain said casing and member on the spindle, a coil spring engaging the spring securing bearing member of the spindle at one end and the spring engaging portion of the yoke member at the other end, and a ferrule secured to the outer end of the roller for retaining the spindle unit in the recess and the prong members in engagement with the end of the roller.

In testimony whereof I affix my signature.

ERNEST W. VANDERHOFF.